United States Patent
Kito (10) Patent No.: US 11,815,182 B2
(45) Date of Patent: Nov. 14, 2023

(54) MECHANICAL SEAL

(71) Applicant: EAGLEBURGMANN JAPAN CO., LTD., Tokyo (JP)

(72) Inventor: Masakazu Kito, Tokyo (JP)

(73) Assignee: EAGLEBURGMANN JAPAN CO., LTD.

(*) Notice: Subject to any disclaimer, the term of this patent is extended or adjusted under 35 U.S.C. 154(b) by 197 days.

(21) Appl. No.: 17/611,878

(22) PCT Filed: May 21, 2020

(86) PCT No.: PCT/JP2020/020108
§ 371 (c)(1),
(2) Date: Nov. 16, 2021

(87) PCT Pub. No.: WO2020/235632
PCT Pub. Date: Nov. 26, 2020

(65) Prior Publication Data
US 2022/0213960 A1   Jul. 7, 2022

(30) Foreign Application Priority Data
May 23, 2019  (JP) .................................. 2019-096825

(51) Int. Cl.
*F16J 15/34* (2006.01)
*B33Y 80/00* (2015.01)

(52) U.S. Cl.
CPC ............... *F16J 15/34* (2013.01); *B33Y 80/00* (2014.12)

(58) Field of Classification Search
CPC ..................................................... F16J 15/34
See application file for complete search history.

(56) References Cited

U.S. PATENT DOCUMENTS 5,556,110 A * 9/1996 Marsi .................... F16J 15/3464
277/397
5,558,342 A * 9/1996 Sedy ..................... F16J 15/3464
277/390
(Continued)

FOREIGN PATENT DOCUMENTS

EP          3252355      12/2017    ............... F16J 15/36
JP          57-153854     9/1982
(Continued)

OTHER PUBLICATIONS

International Search Report and Written Opinion issued in related PCT International Application Serial No. PCT/JP2020/020108, dated Aug. 4, 2020, 13 pages.
(Continued)

*Primary Examiner* — Vishal A Patel
(74) *Attorney, Agent, or Firm* — HAYES SOLOWAY P.C.

(57) ABSTRACT

A mechanical seal includes a pair of seal rings that rotate relative to each other; and a retainer that holds the seal ring. The retainer includes an annular base portion, an annular holding portion that is externally fitted to an outer periphery of the seal ring, and an annular connection portion that connects the base portion and the annular holding portion in an axial direction, and an annular space partially surrounded by the base portion, the annular connection portion, and the annular holding portion is formed between the outer periphery of the seal ring and an inner periphery of the retainer. The retainer has a plurality of beams which are disposed in the annular space to connect the annular base portion and the annular holding portion.

15 Claims, 6 Drawing Sheets

(56) References Cited

U.S. PATENT DOCUMENTS

| | | | |
|---|---|---|---|
| 5,897,118 A * | 4/1999 | Ito .................... | F16J 15/3468 |
| | | | 277/393 |
| 2005/0194746 A1 | 9/2005 | Grace ................. | 277/358 |
| 2007/0210526 A1 * | 9/2007 | Basu .................. | F16J 15/363 |
| | | | 277/359 |
| 2014/0091530 A1 | 4/2014 | Aoike et al. ........ | F16J 15/38 |
| 2019/0078689 A1 | 3/2019 | Takigahira et al. .. | F16J 15/36 |

FOREIGN PATENT DOCUMENTS

| | | | | |
|---|---|---|---|---|
| JP | WO2012169297 | 12/2012 | ............... | F16J 15/34 |
| JP | WO2017188024 | 11/2017 | ............... | F16J 15/36 |
| WO | WO-2017188060 A1 * | 11/2017 | ............... | F16J 15/34 |

OTHER PUBLICATIONS

International Preliminary Report on Patentability issued in related PCT International Application Serial No. PCT/JP2020/020108, dated Dec. 2, 2021, 6 pages.

Extended European Search Report issued in EPO Patent Appln. Serial No. 20809249.0-1015, dated May 25, 2023, 9 pages.

* cited by examiner

(a) A-A CROSS-SECTIONAL VIEW (b) B-B CROSS-SECTIONAL VIEW

MECHANICAL SEAL

TECHNICAL FIELD

The present invention relates to a mechanical seal that seals a rotating shaft.

BACKGROUND ART

A mechanical seal in the related art is configured such that a stationary seal ring which is fixed to a housing and a rotating seal ring which is fixed to a rotating shaft to rotate together with the rotating shaft rotate relative to each other to seal a gap between the housing and the rotating shaft.

For example, in the mechanical seal in the related art, the rotating seal ring is fixed to the rotating shaft via a retainer. The holding of the rotating seal ring by the retainer is performed by so-called shrink fitting in which after the rotating seal ring is inserted in a state where the retainer is heated and thermally expanded, the retainer is cooled and shrunk to cause a holding portion, which has an annular shape and protrudes from an inner periphery of the retainer toward an inner diameter side, to be fitted to an outer periphery of the rotating seal ring. Since an inner periphery of the holding portion is crimped to the outer periphery of the rotating seal ring, the sealing performance between the rotating seal ring and the retainer is secured without use of a secondary seal such as an O-ring.

In addition, in a case where the rotating seal ring is made of a plastic material such as ceramic, when a large contact pressure of the holding portion which comes into contact with the outer periphery of the rotating seal ring during shrink fitting is locally applied, damage to the rotating seal ring or distortion of a sliding surface is generated, which is a problem. Therefore, in a mechanical seal of Patent Citation 1, a holding portion is in wide contact with an outer periphery of a rotating seal ring in an axial direction, so that the contact pressure is substantially uniformly applied over a contact range.

CITATION LIST

Patent Literature

Patent Citation 1: US 2007/0210526 A (page 3, FIG. 1, and FIG. 5)

SUMMARY OF INVENTION

Technical Problem

However, the mechanical seal of Patent Citation 1 has a structure where the holding portion of a retainer is connected to a base end member, to which a bellows is welded and fixed, by an annular connection portion extending from an outer diameter side of the holding portion in the axial direction. The fitting force of the holding portion with respect to the outer periphery of the rotating seal ring is designed by the difference between an inner diameter of the holding portion and an outer diameter of the rotating seal ring before shrink fitting. When the annular connection portion is deformed by the pressure of a sealed fluid during use of the mechanical seal, the holding portion is further displaced from a shrink fitted state to cause the fitting force to become too large. Therefore, not only a sliding surface of the rotating seal ring is deformed, but also the retainer is damaged, which is a problem.

The present invention has been made in view of such problems, and an object of the present invention is to provide a mechanical seal in which a sliding surface of a seal ring is not deformed, and a retainer is unlikely to be damaged.

Solution to Problem

In order to solve the foregoing problems, a mechanical seal according to the present invention is a mechanical seal including: a pair of seal rings that rotate relative to each other; and a retainer that holds one of the seal rings, wherein the retainer includes an annular base portion, an annular holding portion that is externally fitted to an outer periphery of the seal ring, and an annular connection portion that connects the annular base portion and the annular holding portion in an axial direction, wherein an annular space partially surrounded by the annular base portion, the annular connection portion, and the annular holding portion is formed between the outer periphery of the seal ring and an inner periphery of the retainer, and wherein the retainer is provided with a plurality of beams which are disposed in the annular space to connect the annular base portion and the annular holding portion. According to the aforesaid feature of the present invention, since the beams which connect the annular base portion of the retainer and the annular holding portion are formed in the annular space on an inner diameter side of the annular connection portion to increase the structural strength of the annular connection portion, the displacement of the annular holding portion caused by the bending action of the annular connection portion can be restricted. Therefore, during use of the mechanical seal, the influence of the pressure of a sealed fluid on the fitting force of the annular holding portion is suppressed, so that a sliding surface of the seal ring is not deformed and damage to the retainer can be prevented.

It may be preferable that the beams are equiangularly arranged in a circumferential direction. According to this preferable configuration, the structural strength of the annular connection portion is uniformly increased in the circumferential direction by the beams that are equiangularly arranged in the circumferential direction. Therefore, the displacement of the annular holding portion can be reliably restricted.

It may be preferable that the beams are formed to divide the annular space into a radially inner space and a radially outer space. According to this preferable configuration, the displacement of the annular holding portion can be restricted while the annular connection portion located on a radially outer space of the annular space divided by the beams. Therefore, the fitting force of the annular holding portion can be properly maintained to suppress deformation of the sliding surface of the seal ring.

It may be preferable that the beams are made of a material which makes the annular base portion and are integrally formed with the annular base portion. According to this preferable configuration, during shrink fitting, the thermal expansion and shrinkage of the beams can be made equal to the thermal expansion and shrinkage of the annular base portion. Therefore, the fitting force of the annular holding portion can be stabilized.

It may be preferable that the annular holding portion extends from the annular connection portion in an inward radial direction, and further extend toward the annular base portion in the axial direction. According to this preferable configuration, a tip of the annular holding portion wraps around a radially inner side of the annular space and is close to the annular base portion, so that the annular space on the radially outer side is disposed close to an annular holding portion side in the axial direction. Therefore, the bending action of the annular connection portion can be sufficiently exerted.

It may be preferable that the mechanical seal may further include a bellows that is welded and fixed to the annular base portion. According to this preferable configuration, a base end member to which the bellows is welded and fixed and the retainer can be integrated in structure. Therefore, the structural strength can be increased without forming a joint portion in the retainer.

It may be preferable that the retainer may be integrally formed by a three-dimensional fabricating apparatus. According to this preferable configuration, the annular space or the beams formed in the retainer can be simply formed.

DESCRIPTION OF EMBODIMENTS

Modes for implementing a mechanical seal according to the present invention will be described below based on an embodiment.

Embodiment

A mechanical seal according to the embodiment of the present invention will be described with reference to FIGS. 1 to 3. Incidentally, a description will be given based on the premise that an inner diameter side of a rotating seal ring and a stationary seal ring forming the mechanical seal is an atmosphere side as a leakage side (i.e., low-pressure side) and an outer diameter side is a sealed fluid side (i.e., high-pressure side).

Figure 1:
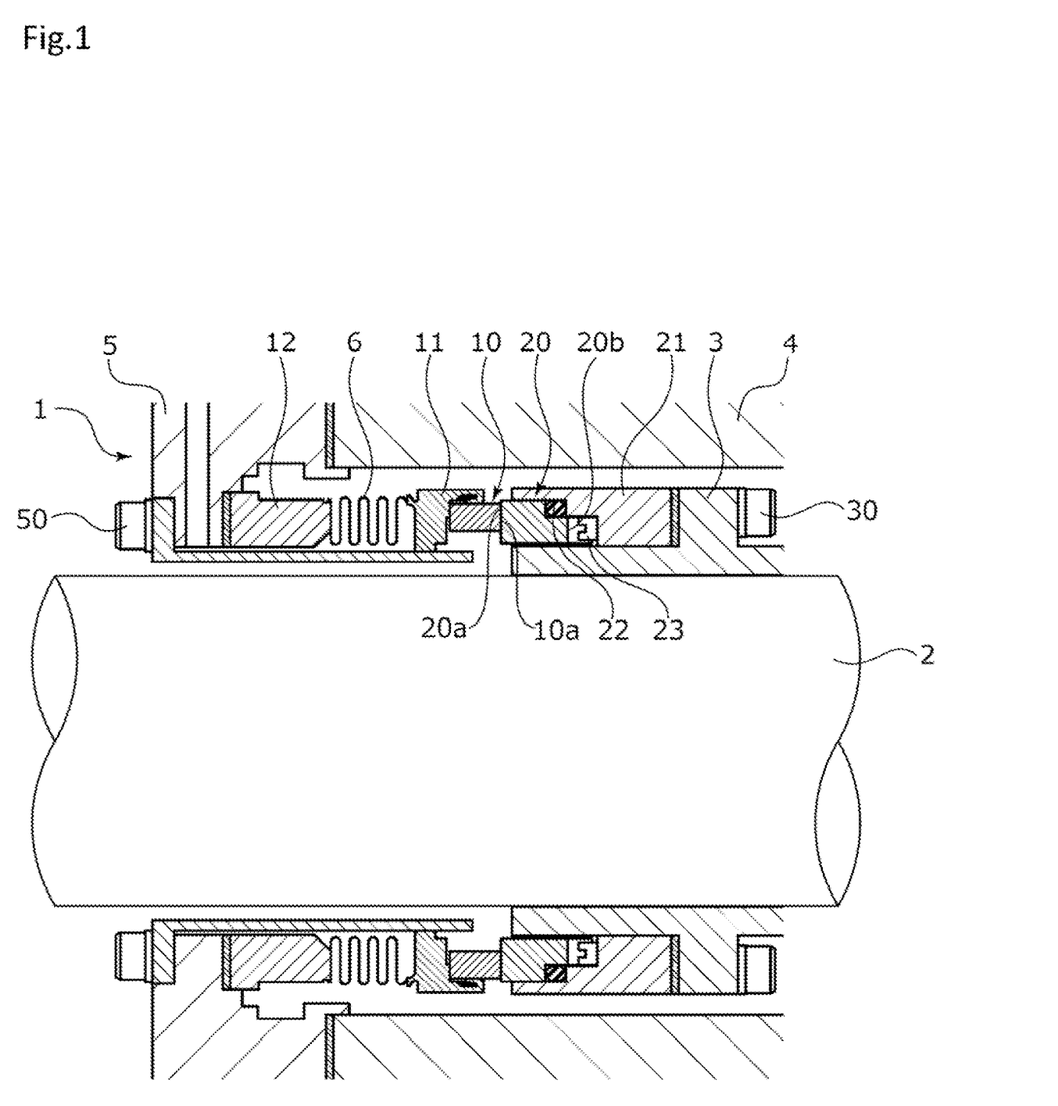
FIG. 1 is a longitudinal cross-sectional view illustrating one example of a mechanical seal in an embodiment of the present invention.

A mechanical seal 1 for a general industrial machine illustrated in FIG. 1 is an inside mechanical seal that seals a sealed liquid tending to leak from the outer diameter side toward the inner diameter side of a sliding surface, and mainly includes a rotating seal ring 20 having an annular shape as a seal ring that is provided so as to be rotatable together with a rotating shaft 2 and a sleeve 3 fixed to the rotating shaft 2, and a stationary seal ring 10 having an annular shape as a seal ring that is provided on a seal cover 5 fixed to a housing 4 of a mounted apparatus so as to not be rotatable but be movable in an axial direction. The stationary seal ring 10 is biased in the axial direction by a bellows 6, so that a sliding surface 10a of the stationary seal ring 10 and a sliding surface 20a of the rotating seal ring 20 slide in close contact with each other. Incidentally, one end in the axial direction of the bellows 6 is welded and fixed to a retainer 11 made of metal and holding the stationary seal ring 10, and the other end in the axial direction is welded and fixed to a collar 12 made of metal and integrally fixed to the seal cover 5 with a bolt 50.

The stationary seal ring 10 and the rotating seal ring 20 are made of, representatively, SiC (as an example of hard material) or a combination of SiC and carbon (as an example of soft material), but are not limited thereto, and a sliding material can be applied as long as the sliding material is used as a sliding material for a mechanical seal.

Incidentally, materials consisting of different components and compositions of two or more phases, for example, SiC in which graphite particles are dispersed, reaction-sintered SiC consisting of SiC and Si, SiC—TiC, SiC—TiN, and the like including a sintered body in which boron, aluminum, carbon, or the like is used as a sintering additive can be used as the SiC. Resin molded carbon, sintered carbon, and the like including carbon in which a carbonaceous material and a graphite material are mixed as the carbon. In addition, in addition to the above sliding materials, metallic materials, resin materials, surface modifying materials (coating materials), composite materials, or the like can also be applied. Further incidentally, when a highly corrosive fluid is used as the sealed fluid, a highly corrosion-resistant material such as a nickel-based superalloy can also be applied.

As illustrated in FIG. 1, the rotating seal ring 20 is formed in a substantially L shape in a cross-sectional view, and is inserted into an inner periphery of a retainer 21 with an O-ring 22 interposed therebetween, the retainer 21 having a substantially cylindrical shape and being integrally fixed to the sleeve 3 with a bolt 30, so that the rotating seal ring 20 is held. Incidentally, the O-ring 22 functions as a secondary seal to secure the sealing performance between the rotating seal ring 20 and the retainer 21. In addition, a locking pin 23 extending from the retainer 21 in the axial direction is inserted into a recessed portion 20b formed on an opposite side in the axial direction of the rotating seal ring 20 from the sliding surface 20a, so that the rotating seal ring 20 can rotate together with the rotating shaft 2.

Figure 2:
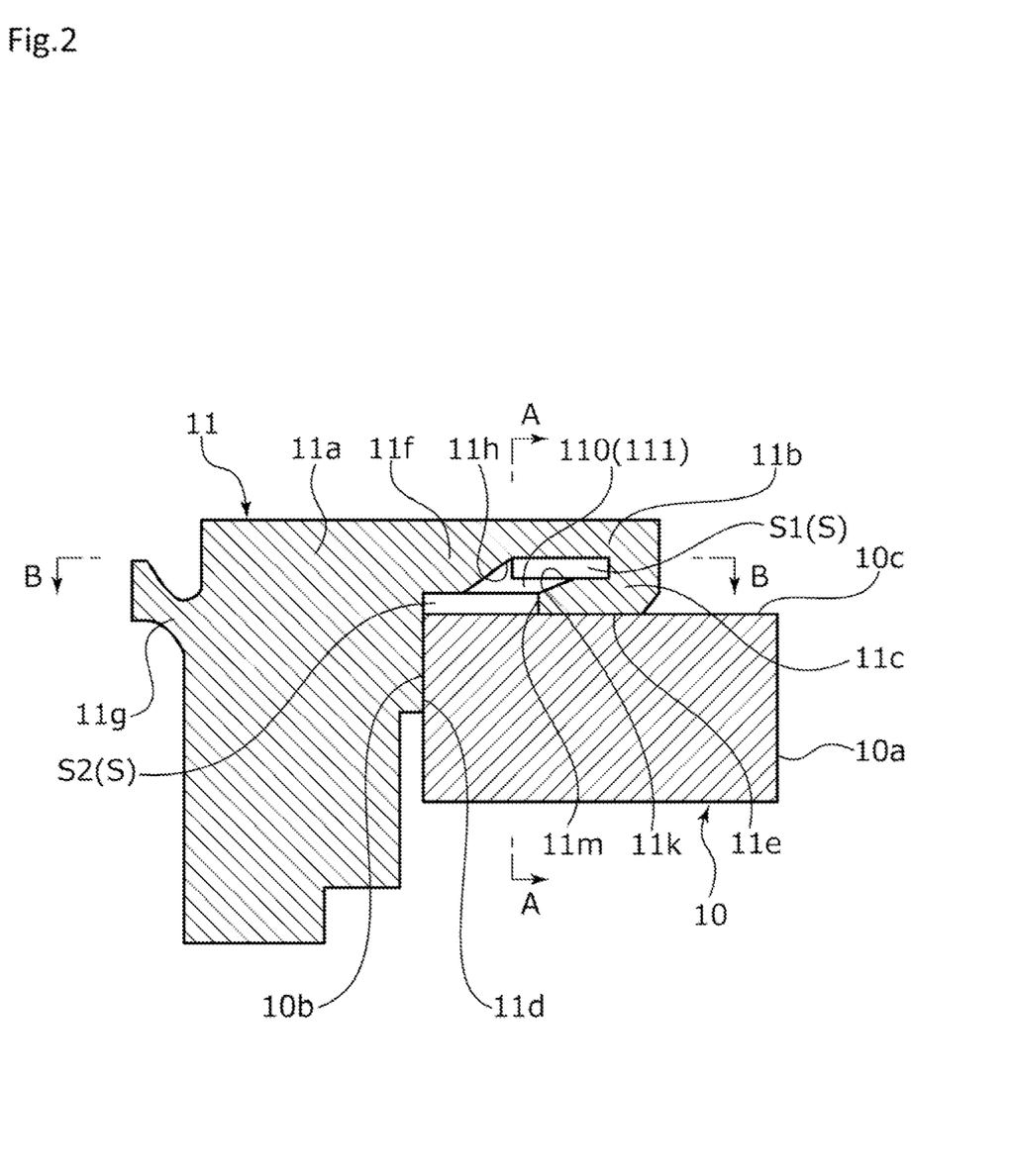
FIG. 2 is an enlarged cross-sectional view illustrating a retainer and a stationary seal ring in the embodiment.
Figure 3:
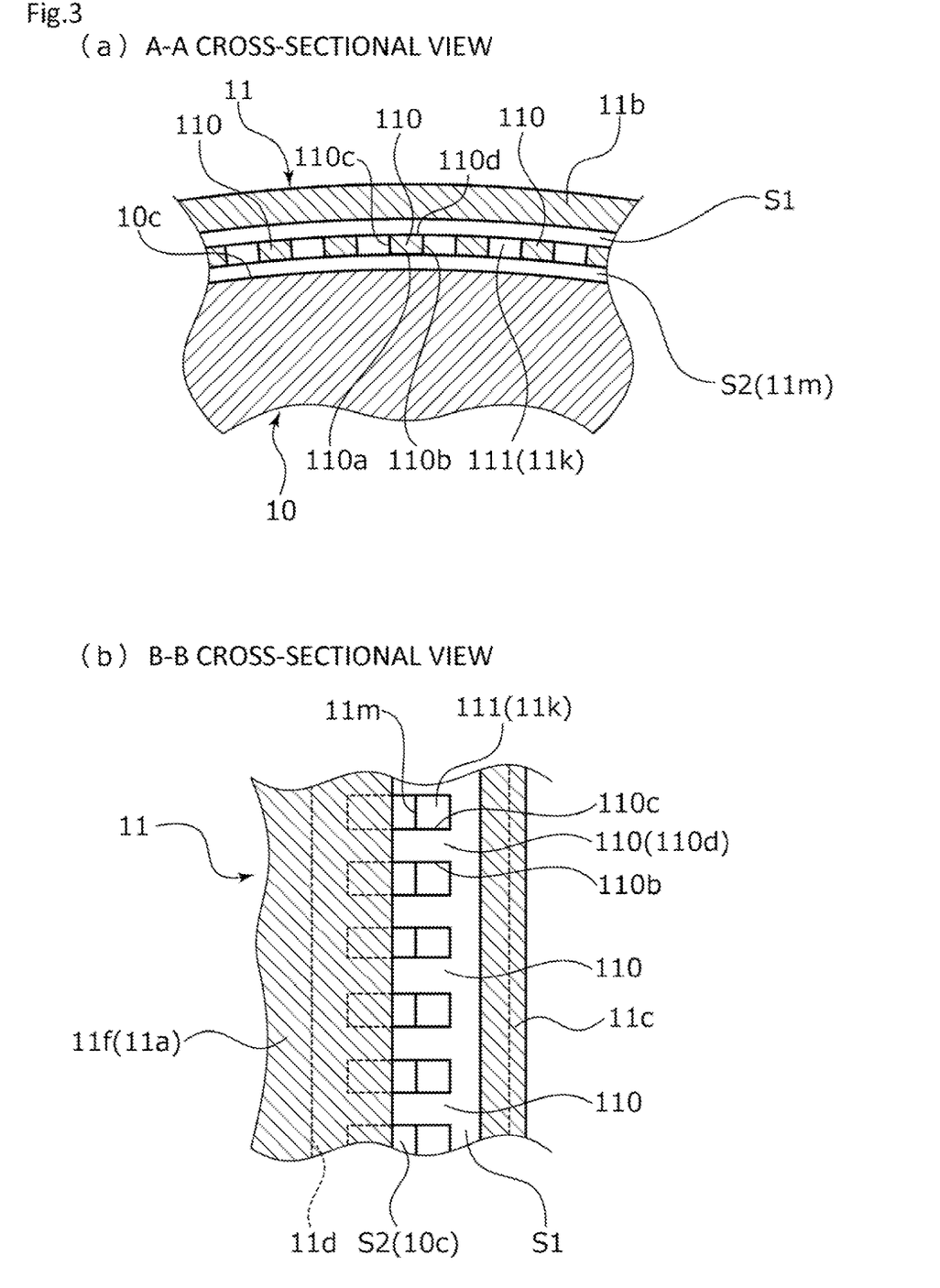
FIG. 3A is a cross-sectional view taken along line A-A extending along a radial direction in FIG. 2.
FIG. 3B is a cross-sectional view taken along line B-B extending along a circumferential direction in FIG. 2.

As illustrated in FIG. 2, the stationary seal ring 10 is formed in a substantially rectangular shape in a cross-sectional view, and an annular holding portion 11c of the retainer 11 is fitted to a substantially central portion in the axial direction of an outer peripheral surface 10c in a state where the outer diameter side of a back surface 10b on an opposite side in the axial direction of the stationary seal ring 10 from the sliding surface 10a is in contact with an inner surface 11d of the retainer 11 having a substantially cylindrical shape in the axial direction, so that the stationary seal ring 10 is held. The holding of the stationary seal ring 10 by the retainer 11 is performed, for example, by so-called shrink fitting in which the stationary seal ring 10 is inserted into the retainer 11 that is heated and thermally expanded, and in a state where the back surface 10b is in contact with the inner surface 11d of the retainer 11 in the axial direction, the retainer 11 is cooled and shrunk to cause the annular holding portion 11c to be fitted to the outer peripheral surface 10c of the stationary seal ring 10. Accordingly, an inner peripheral surface 11e of the annular holding portion 11c is crimped to the outer peripheral surface 10c of the stationary seal ring 10, so that the sealing performance between the stationary seal ring 10 and the retainer 11 is secured without use of a secondary seal such as an O-ring. In addition, since the back surface 10b of the stationary seal ring 10 and the inner surface 11d of the retainer 11 are in contact with each other in the axial direction, the position in the axial direction of the stationary seal ring 10 with respect to the retainer 11 is stable during shrink fitting or use. Incidentally, in FIG. 2, for convenience of description, the illustration of the bellows 6 which is welded and fixed to the retainer 11 is omitted.

Next, the structure of the retainer 11 will be described in detail. As illustrated in FIGS. 2 and 3, the retainer 11 has a substantially L shape in a cross-sectional view, which includes a base portion 11a having an annular shape, an annular connection portion 11b, and the annular holding portion 11c. An annular space S surrounded by the base portion 11a, the annular connection portion 11b, and the annular holding portion 11c is formed on an inner periphery of the retainer 11. A plurality of beams 110 which connect the base portion 11a and the annular holding portion 11c in the axial direction are evenly disposed in the annular space S in a circumferential direction (particularly, refer to FIG. 3). Incidentally, the retainer 11 is integrally made of the same material by a three-dimensional fabricating apparatus, for example, a 3D printer. Further incidentally, the annular space S is a space that is substantially closed in a state where the stationary seal ring 10 is held by the retainer 11.

The base portion 11a includes the inner surface 11d, with which the back surface 10b of the stationary seal ring 10 is in contact, on one end side in the axial direction, an annular extending portion 11f, which extends in the axial direction, on the outer diameter side of the inner surface 11d, and a fixed portion 11g, to which one end in the axial direction of the bellows 6 is welded and fixed, on the other end side in the axial direction. Incidentally, a tapered surface 11h which is inclined toward an outer diameter direction is formed on one end side in the axial direction of an inner periphery of the annular extending portion 11f, so that the annular extending portion 11f has a pentagonal shape in a cross-sectional view.

The annular connection portion 11b extends from one end in the axial direction of the annular extending portion 11f of the base portion 11a in the axial direction. Incidentally, the annular connection portion 11b has a smaller plate thickness than the annular extending portion 11f, and easily exerts a bending action during shrink fitting or a bending action by the pressure of the sealed fluid during use of the mechanical seal.

The annular holding portion 11c extends to the inner diameter side from a free end portion that is one end portion in the axial direction of the annular connection portion 11b, and then bends to a base portion 11a side to extend in the axial direction, so that the annular holding portion 11c has a substantially L shape in a cross-sectional view. Incidentally, a tapered surface 11k, which is inclined toward an inner diameter direction to be substantially parallel to the tapered surface 11h of the annular extending portion 11f, is formed at a tip on the base portion 11a side of the annular holding portion 11c. In addition, an inner surface 11m, which extends from an inner diameter end of the tapered surface ilk toward the inner diameter direction and is orthogonal to the inner peripheral surface lie of the annular holding portion 11c, is formed at the tip on the base portion 11a side of the annular holding portion 11c.

The beam 110 extends in the axial direction to connect a virtual tapered surface, which is obtained by extending the tapered surface ilk at the tip of the annular holding portion 11c in the circumferential direction, and a virtual tapered surface obtained by extending the tapered surface 11h of the annular extending portion 11f of the base portion 11a in the circumferential direction. Specifically, as illustrated in FIG. 3A, the beam 110 is formed as a columnar body having a substantially rectangular shape in a cross-sectional view, which is formed by a surface 110a on an inner peripheral side, a surface 110d on an outer peripheral side, and two side surfaces 110b and 110c extending in a radial direction. Incidentally, the surface 110a on the inner peripheral side of the beam 110 is formed as a flat surface extending to the base portion 11a side in the axial direction from an inner diameter end of the virtual tapered surface, which is obtained by extending the tapered surface 11k in the circumferential direction, toward an inner diameter end of the virtual tapered surface obtained by extending the tapered surface 11h in the circumferential direction. In addition, the surface 110d on the outer peripheral side of the beam 110 is formed as an L-shaped bent surface that extends to the base portion 11a side in the axial direction from an outer diameter end of the virtual tapered surface, which is obtained by extending the tapered surface 11k in the circumferential direction, and then bends to the outer diameter side to extend toward an outer diameter end of the virtual tapered surface obtained by extending the tapered surface 11h in the circumferential direction. In addition, the surfaces 110a and 110d of the beam 110 on inner and outer sides in the radial direction may be curved in the circumferential direction.

In addition, a first annular space S1 surrounded by the annular connection portion 11b, the annular holding portion 11c, and the surface 110d on the outer peripheral side of the beam 110 is formed on the outer diameter side of the beam 110, namely, inside the retainer 11. In addition, a second annular space S2 surrounded by the base portion 11a, the inner surface 11m of the annular holding portion 11c, and the surface 110a on the inner peripheral side of the beam 110 is formed on the inner diameter side of the beam 110, namely, between the beam 110 and the outer peripheral surface 10c of the stationary seal ring 10 held on the inner diameter side of the retainer 11. In addition, the first annular space S1 and the second annular space S2 communicate with each other through communication holes 111 formed between the beams 110 that are evenly disposed in the circumferential direction. In other words, the annular space S is separated into the first annular space S1 and the second annular space S2 on the inner and outer sides in the radial direction by the plurality of beams 110. Incidentally, the first annular space S1 and the second annular space S2 are formed to have substantially the same length in the axial direction (particularly, refer to FIG. 2). Further incidentally, the ratio of the lengths of the beam 110 and the communication hole 111 in the circumferential direction is in the range of 2:1 to 1:2, preferably 1:1, and the lengths are substantially the same in the present embodiment (particularly, refer to FIG. 3).

Accordingly, since the beams 110 which connect the annular extending portion 11f of the base portion 11a of the retainer 11 and the annular holding portion 11c are formed in the annular space S on the inner diameter side of the annular connection portion 11b to increase the structural strength of the annular connection portion 11b, the displacement of the annular holding portion 11c caused by the bending action of the annular connection portion 11b can be restricted. Therefore, during use of the mechanical seal 1, the influence of the pressure of the sealed fluid on the fitting force of the annular holding portion 11c is suppressed, so that the sliding surface 10a of the stationary seal ring 10 is not deformed and damage to the retainer 11 can be prevented. In addition, since the beams 110 can restrict the displacement of the annular holding portion 11c without increasing the plate thickness of the annular connection portion 11b, the fitting force of the annular holding portion 11c with respect to the outer peripheral surface 10c of the stationary seal ring 10 is properly, easily maintained, and crack of the stationary seal ring 10, distortion of the sliding surface 10a, or the like can be prevented.

In addition, since the structural strength of the annular connection portion 11b is substantially uniformly increased in the circumferential direction by the beams 110 that are evenly disposed in the circumferential direction, the displacement of the annular holding portion 11c can be reliably restricted.

In addition, since the annular space S formed on the inner periphery of the retainer 11 is separated into the first annular space S1 and the second annular space S2 on the inner and outer sides in the radial direction by the beams 110, the annular connection portion 11b which is located on the outer diameter side of the first annular space S1 separated on the outer diameter side by the beams 110 is easily deformed particularly during shrink fitting, and the displacement of the annular holding portion 11c can be restricted by the beams 110 while the fitting force of the annular holding portion 11c generated by the bending action of the annular connection portion 11b is properly maintained. Therefore, during use of the mechanical seal 1, the fitting force of the annular holding portion 11c for the pressure of the sealed fluid can be properly maintained to suppress deformation of the sliding surface 10a of the stationary seal ring 10.

In addition, since the beam 110 is integrally made of the same material as that of the base portion 11a, the annular connection portion 11b, and the annular holding portion 11c, during shrink fitting, the thermal expansion and shrinkage of the beam 110 can be made equal to the thermal expansion and shrinkage of the retainer 11. Therefore, the fitting force of the annular holding portion 11c with respect to the outer peripheral surface 10c of the stationary seal ring 10 can be stabilized.

In addition, the annular holding portion 11c extends inward from the annular connection portion 11b in the radial direction, and further extends toward the base portion 11a in the axial direction to wrap around the annular space S, particularly, an inner side in the radial direction of the first annular space S1, so that the tapered surface 11k at the tip of the annular holding portion 11c is close to the tapered surface 11h of the annular extending portion 11f in the axial direction. Accordingly, the beams 110 and the annular connection portion 11b can be separated from each other in the radial direction with the first annular space S1 interposed therebetween, and the first annular space S1 can be disposed close to an annular holding portion 11c side in the axial direction, namely, a free end portion side of the annular connection portion 11b. Therefore, the bending action of the annular connection portion 11b can be sufficiently exerted. Namely, since the beams 110 are formed to be separated from the free end portion of the annular connection portion 11b in the radial direction and the axial direction, the beams 110 do not disturb the bending action of the annular connection portion 11b, which contributes to the fitting force of the annular holding portion 11c during shrink fitting, and during use of the mechanical seal 1, the influence of the pressure of the sealed fluid on the fitting force of the annular holding portion 11c can be suppressed.

In addition, since both ends in the axial direction of the beam 110 connect the virtual tapered surface, which is obtained by extending the tapered surface 11h of the annular extending portion 11f of the base portion 11a in the circumferential direction, and the virtual tapered surface obtained by extending the tapered surface 11k at the tip of the annular holding portion 11c in the circumferential direction, the cross-sectional areas of both ends in the axial direction of the beam 110 can be formed to be large, thus to increase the strength of the beam 110.

In addition, since the beam 110 has an inclined structure as described above, a part of a radial stress component caused by the pressure of the sealed fluid during shrink fitting or use of the mechanical seal 1 is dispersed in the axial direction. Therefore, the fitting force of the annular holding portion 11c is unlikely to become too large, and damage to the stationary seal ring 10 or the retainer 11 can be effectively prevented.

In addition, since the base portion 11a of the retainer 11 has an integral structure to also serve as a base end member to which the bellows 6 is welded and fixed, the structural strength can be increased without forming a joint portion in the retainer 11.

In addition, since the retainer 11 is integrally formed by a three-dimensional fabricating apparatus such as a 3D printer, the first annular space S1 or the beams 110 formed inside the retainer 11 can be simply formed.

In addition, since the retainer 11 can properly maintain the fitting force of the annular holding portion 11c with respect to the outer peripheral surface 10c of the stationary seal ring 10, a highly corrosion-resistant material such as a nickel-based superalloy can be applied to the stationary seal ring 10 of the mechanical seal 1.

The embodiment of the present invention has been described above with reference to the drawings; however, the specific configuration is not limited to the embodiment, and the present invention also includes changes or additions that are made without departing from the concept of the present invention.

For example, in the embodiment, the configuration where the beams 110 are formed in the retainer 11 holding the stationary seal ring 10 has been described; however, the present invention is not limited thereto, the beams may be formed in the retainer 21 holding the rotating seal ring 20, or the beams may be formed in both the retainers 11 and 21 holding the stationary seal ring 10 and the rotating seal ring 20.

Figure 4:
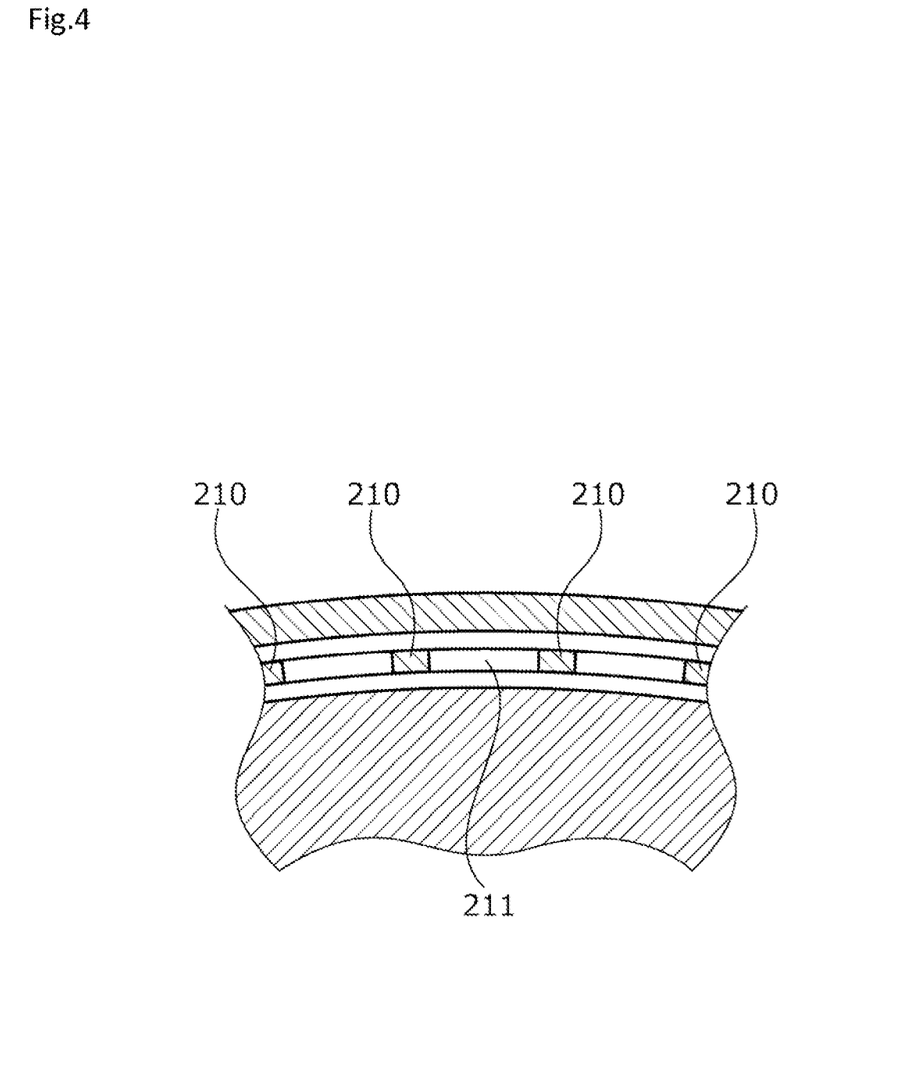
FIG. 4 is a cross-sectional view illustrating a modification example of the retainer in the embodiment.

In addition, the beam and the communication hole are not limited to being formed to have substantially the same length in the circumferential direction, and for example, as illustrated in a modification example of FIG. 4, a communication hole 211 may be formed as an elongated hole which is longer than a beam 210 in the circumferential direction. In addition, the present invention is not limited to the configuration where the plural of beams are provided, and one beam which has a C shape is long in the circumferential direction may be provided.

Figure 5:
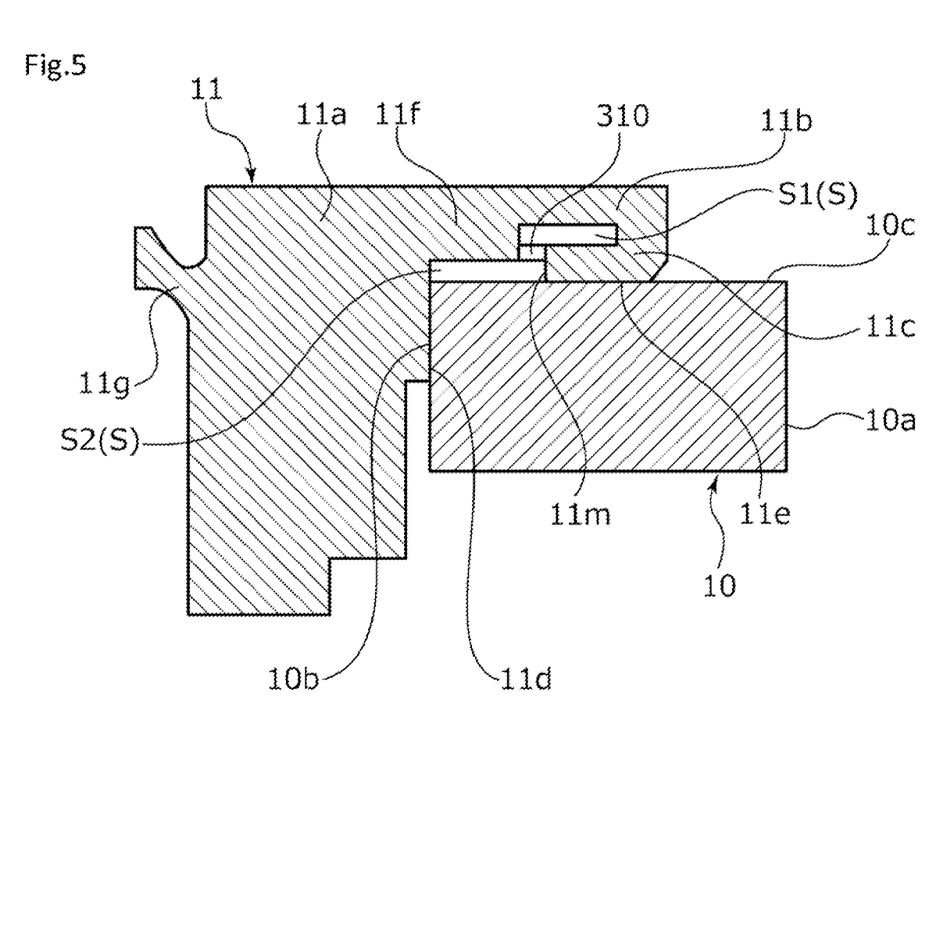
FIG. 5 is a cross-sectional view illustrating a modification example of the retainer in the embodiment.

In addition, in the embodiment, the configuration where the beam 110 extends in the axial direction to connect the virtual tapered surface, which is obtained by extending the tapered surface 11k at the tip of the annular holding portion 11c in the circumferential direction, and the virtual tapered surface obtained by extending the tapered surface 11h of the annular extending portion 11f of the base portion 11a in the circumferential direction has been described; however, the present invention is not limited thereto, and for example, as illustrated in a modification example of FIG. 5, a beam 310 may be formed to connect the base portion and the inner surface of the annular holding portion, the inner surface being orthogonal to the axial direction. Incidentally, the annular extending portion 11f may not be formed in the base portion 11a.

In addition, the shape of the beam may be freely configured as long as the beam connects the base portion 11a and the annular holding portion 11c. In addition, the beam may be formed in a circular shape in a cross-sectional view or in a polygonal shape in a cross-sectional view.

In addition, in the embodiment, the configuration where the annular space S formed on the inner periphery of the retainer 11 is separated into the first annular space S1 and the second annular space S2 on the inner and outer sides in the radial direction by the beams 110, and the annular connection portion 11b is located on the outer diameter side of the first annular space S1 has been described; however, the present invention is not limited thereto, and the first annular space S1 may not be formed on the outer diameter side of the beams, and the beams may be integrally formed along a surface on the inner diameter side of the annular connection portion 11b. In addition, a part of the beams, for example, a part on the base portion 11a side may be integrally and partially formed on the surface on the inner diameter side of the annular connection portion 11b.

In addition, the beam may be made of a material different from that of the base portion 11a, the annular connection portion 11b, and the annular holding portion 11c of the retainer 11, and both ends of the beam may be welded and fixed to the base portion 11a and the annular holding portion 11c, respectively.

In addition, the annular holding portion 11c may not be formed to wrap around the inner side in the radial direction of the first annular space S1.

Figure 6:
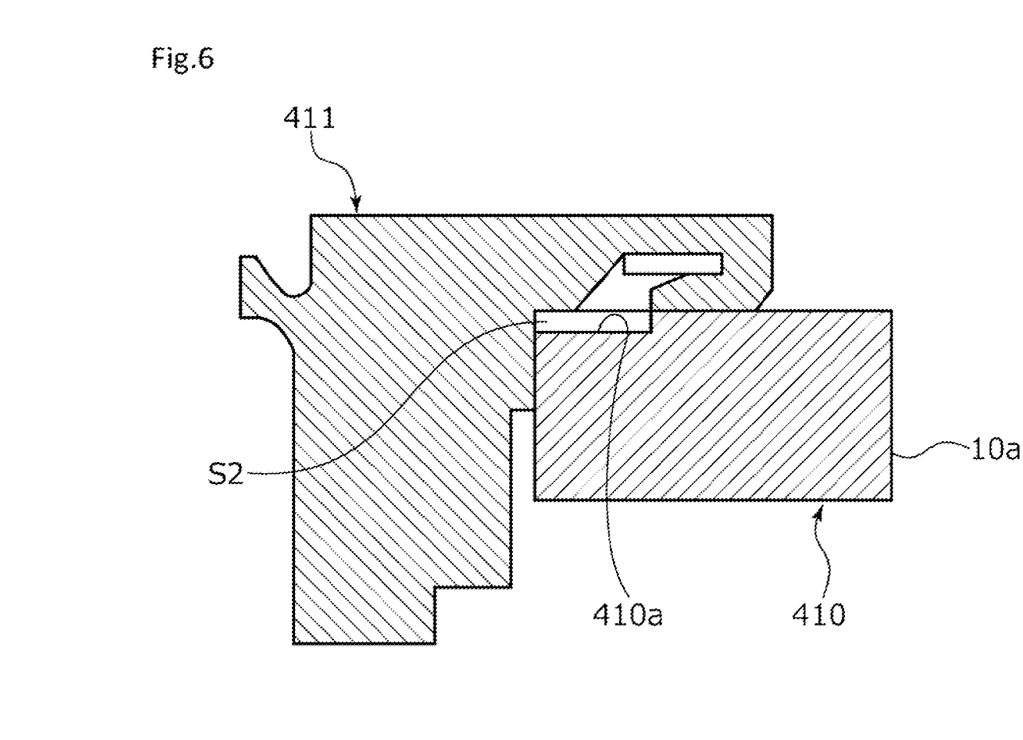
FIG. 6 is a cross-sectional view illustrating a modification example of the retainer and the stationary seal ring in the embodiment.

In addition, as illustrated in a modification example of FIG. 6, a recessed portion 410a provided in an outer peripheral surface of a stationary seal ring 410 may form the second annular space S2 between the stationary seal ring 410 and an inner periphery of a retainer 411.

In addition, the back surface 10b of the stationary seal ring 10 may not be in contact with the inner surface 11d of the base portion 11a of the retainer 11. In this case, the annular holding portion 11c of the retainer 11 may be fitted to a recessed groove having an annular shape and formed in the outer peripheral surface 10c of the stationary seal ring 10 such that the positional offset of the stationary seal ring 10 with respect to the retainer 11 in the axial direction can be prevented.

In addition, the base portion of the retainer 11 and a base end member to which the bellows 6 is welded and fixed may be formed separately.

In addition, in the embodiment, the configuration where the stationary seal ring 10 is biased in the axial direction by the biasing force of the bellows 6 has been described; however, the present invention is not limited thereto, and biasing force may be applied by a spring that is disposed separately.

REFERENCE SIGNS LIST

1 Mechanical seal
2 Rotating shaft
3 Sleeve
4 Housing
5 Seal cover
6 Bellows
10 Stationary seal ring (seal ring)
10a Sliding surface
11 Retainer
11a Annular base portion
11b Annular connection portion
11c Annular holding portion
11f Annular extending portion
11h, 11k Tapered surface
12 Collar
20 Rotating seal ring (seal ring)
20a Sliding surface
21 Retainer
110 Beam
111 Communication hole
210 Beam
211 Communication hole
310 Beam
410 Stationary seal ring
410a Recessed portion
411 Retainer
S Annular space
S1 First annular space (radially outer space)
S2 Second annular space (radially inner space)

The invention claimed is:

1. A mechanical seal comprising:
a pair of seal rings that rotate relative to each other; and
a retainer that holds one of the seal rings, wherein
the retainer includes an annular base portion, an annular holding portion that is externally fitted to an outer periphery of the seal ring, and an annular connection portion that connects the annular base portion and the annular holding portion in an axial direction, wherein
an annular space partially surrounded by the annular base portion, the annular connection portion, and the annular holding portion is formed between the outer periphery of the seal ring and an inner periphery of the retainer, wherein
the retainer is provided with a plurality of beams which are disposed in the annular space to connect the annular base portion and the annular holding portion, wherein the beams are formed to divide the annular space into a radially inner space and a radially outer space, and wherein the radially inner space is defined by a surface of the annular base portion, an inner surface of the beam, a first surface of the annular holding portion, the radially outer space is defined by a surface of the annular connection portion, a second surface of the holding portion and an outer surface of the beam.

2. The mechanical seal according to claim 1, wherein the beams are equiangularly arranged in a circumferential direction.

3. The mechanical seal according to claim 1, wherein the beams are made of a material which makes the annular base portion and are integrally formed with the annular base portion.

4. The mechanical seal according to claim 1, wherein the annular holding portion extends from the annular connection portion in an inward radial direction, and further extends toward the annular base portion in the axial direction.

5. The mechanical seal according to claim 1, further comprising a bellows that is welded and fixed to the annular base portion.

6. The mechanical seal according to claim 1, wherein the retainer is integrally formed by a three-dimensional fabricating apparatus.

7. The mechanical seal according to claim 2, wherein the beams are formed to divide the annular space into a radially inner space and a radially outer space.

8. The mechanical seal according to claim 2, wherein the beams are made of a material which makes the annular base portion and are integrally formed with the annular base portion.

9. The mechanical seal according to claim 2,
wherein the annular holding portion extends from the annular connection portion in an inward radial direction, and further extends toward the annular base portion in the axial direction.

10. The mechanical seal according to claim 2, further comprising a bellows that is welded and fixed to the annular base portion.

11. The mechanical seal according to claim 2,
wherein the retainer is integrally formed by a three-dimensional fabricating apparatus.

12. The mechanical seal according to claim 3,
wherein the annular holding portion extends from the annular connection portion in an inward radial direction, and further extends toward the annular base portion in the axial direction.

13. The mechanical seal according to claim 3, further comprising a bellows that is welded and fixed to the annular base portion.

14. The mechanical seal according to claim 3,
wherein the retainer is integrally formed by a three-dimensional fabricating apparatus.

15. The mechanical seal according to claim 4, further comprising a bellows that is welded and fixed to the annular base portion.

* * * * *